United States Patent [19]

Leppek

[11] Patent Number: 5,246,281
[45] Date of Patent: Sep. 21, 1993

[54] ELECTROHYDRAULIC BRAKE SYSTEM

[75] Inventor: Kevin G. Leppek, Rochester Hills, Mich.

[73] Assignee: General Motors Corporation, Detroit, Mich.

[21] Appl. No.: 926,439

[22] Filed: Aug. 10, 1992

[51] Int. Cl.$^5$ .............................................. B60T 8/42
[52] U.S. Cl. .............................. 303/114.1; 303/114.2; 303/115.2; 60/545; 60/562
[58] Field of Search ............... 303/114.1, 114.2, 115.2; 60/562, 565, 545, 584

[56] References Cited

U.S. PATENT DOCUMENTS

| | | | |
|---|---|---|---|
| 3,488,957 | 1/1970 | Snitgen | 60/565 |
| 4,015,881 | 4/1977 | Adachi | 303/114.2 |
| 4,580,847 | 4/1986 | Burgdorf | 303/114.2 X |
| 4,582,365 | 4/1986 | Belart | 303/114.1 |
| 4,631,924 | 12/1986 | Lowe | 60/562 |
| 4,703,978 | 11/1987 | Belart et al. | 303/114.1 X |
| 4,730,877 | 3/1988 | Seibert et al. | 303/114.1 X |
| 4,807,942 | 2/1989 | Belart | 303/114.1 |
| 5,026,125 | 6/1991 | Matouka et al. | 303/115.2 X |
| 5,031,968 | 7/1991 | Takata | 60/545 X |
| 5,042,885 | 8/1991 | Villec | 303/115.2 X |
| 5,061,016 | 10/1991 | Hirobe | 303/114.1 |
| 5,163,744 | 11/1992 | Tierney et al. | 303/115.2 |

Primary Examiner—Robert J. Oberleitner
Assistant Examiner—Peter M. Poon
Attorney, Agent, or Firm—Ernest E. Helms

[57] ABSTRACT

A braking system is provided which, in a preferred embodiment, includes a master cylinder having a bore with first and second diameters, a first piston slidably mounted within the master cylinder having a first periphery sealed with the bore first diameter and a second periphery sealed with the bore second diameter, the first piston establishing within the master cylinder bore a first pressure chamber between the first and second sealed peripheries and a second pressure chamber between the first piston second sealed periphery and the bore closed end, the first piston also having a central bore exposed to the second pressure chamber, first and second fluid lines joining the first and second pressure chambers with the wheel brake, a second piston slidably sealably inserted within the first piston bore, the second piston having a flange and having limiting displacement away from the bore closed end, a spring captured between the first piston and the second piston flange, a pressure sensor to determine the pressure within the second pressure chamber, a solenoid valve located in the second fluid line closing upon a signal delivered by actuation of the second piston, and an electrically powered actuator coupled to the first fluid line to modulate the pressure within the wheel brake in response to a signal given by the pressure sensor.

8 Claims, 3 Drawing Sheets

ELECTROHYDRAULIC BRAKE SYSTEM

FIELD OF THE INVENTION

The field of the present invention is that of an electrohydraulic braking system for a motor vehicle.

SUMMARY OF THE INVENTION

The present invention provides an electrohydraulic vehicle braking system which, in a preferred embodiment, provides normal braking, antilock braking (ABS) and traction control modes of operation. Additionally, the present invention provides an electrohydraulic braking system which provides the pedal feel typically associated with hydraulic braking systems.

DETAILED DESCRIPTION OF THE INVENTION

Figure 1:
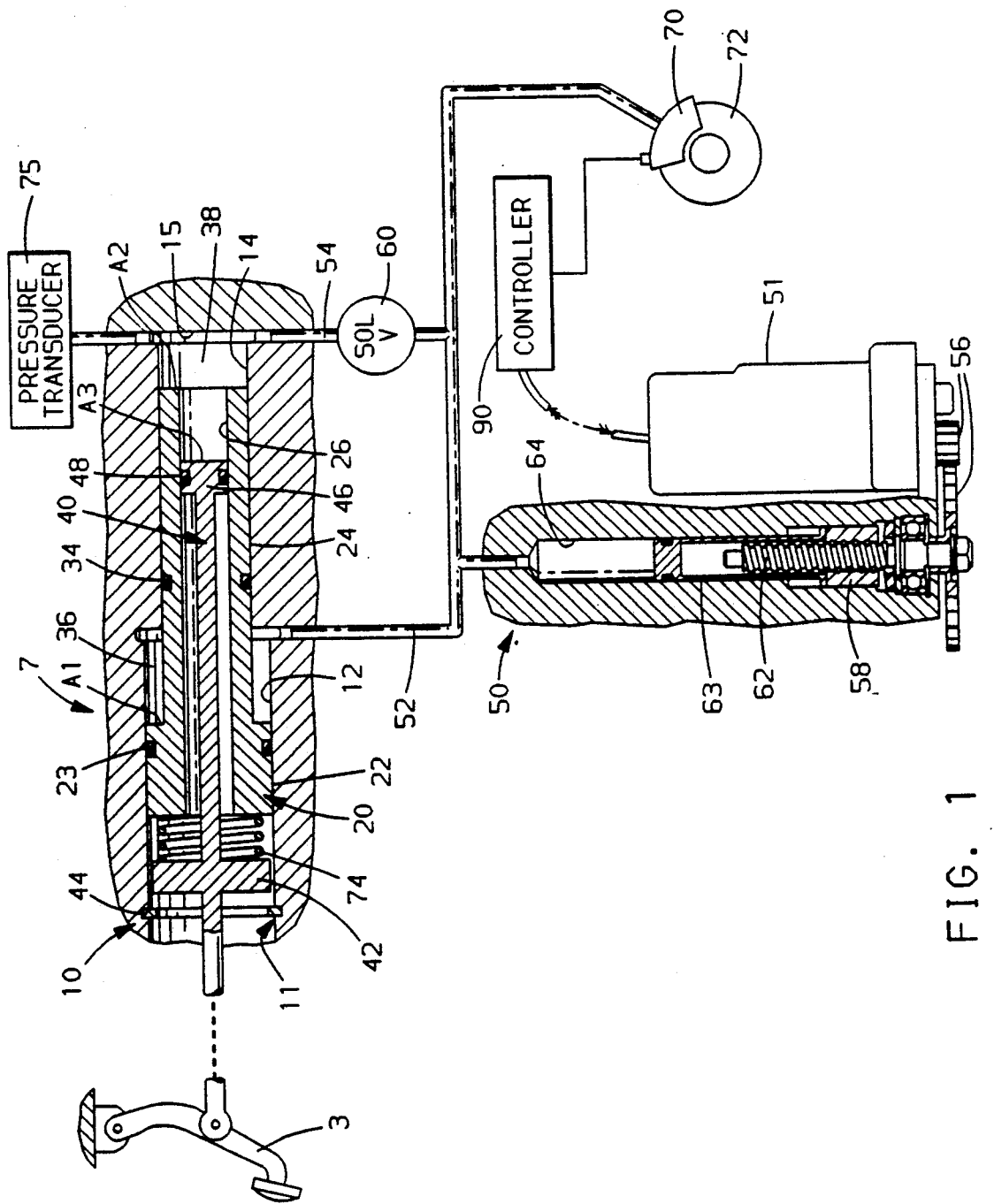
FIG. 1 is a schematic view of a preferred embodiment of the present invention.

Referring to FIG. 1, the present invention provides a braking system 7 which can operate in the normal mode, ABS mode or traction control mode of operation. The braking system 7 is provided with a master cylinder 10 which has a multidiameter bore 11 with a first diameter 12 and a second concentric and smaller diameter 14, along with a closed end 15.

Slidably and sealably mounted within the bore 11 of the master cylinder is a first piston 20. The first piston has a first outer diameter 22 which is sealed along its periphery by an annular O-ring 23 which is fitted within a groove in its first diameter 22. A second seal ring 34 is captured within a groove of a second smaller diameter 14 of the primary piston. The first 23 and second 34 seal rings divide the bore 11 of the master cylinder into a first pressure chamber 36 between the O-rings 23 and 34. Between the second O-ring 34 and the bore end 15 there is provided a second pressure chamber 38.

The first piston 20 has a central concentric bore 26 which is fluidly exposed to the second pressure chamber 38. Slidably mounted within the bore 26 is a second piston or push rod 40. The push rod 40 has a flange 42 which captures between itself and the first piston 20 a compliant spring 74. A stop 44 is provided to limit the translational travel of the second piston 40 away from the closed end 15 of the master cylinder bore. The second piston 40 also has a head 46 with a seal ring 48 which seals the interior 26 of the primary piston. At its opposite end, the secondary piston 40 is operatively associated with a brake pedal 3 which is utilized by the vehicle operator to place an input into the system. A standard disc-type fluid-actuated brake caliper 70 is utilized to restrain rotation of a disc 72, which is attached to the vehicle wheel. However, the present invention can be utilized in conjunction with drum-type vehicle brakes.

Connecting the brake 70 with the first pressure chamber 36 is a first fluid line 52. Connecting the brake 70 with the second pressure chamber 38 is a second fluid line 54. Fluid line 54 has interposed in it a normally open solenoid valve 60 which closes upon actuation of the second piston 40 by virtue of the vehicle operator's force input.

To sense the pressure within the second pressure chamber 38, there is provided a pressure transducer 75 which is linked directly or via a controller 90 with an electrically actuated fluid actuator 50.

The fluid actuator 50 is powered by an electric motor 51 which is torsionally associated with a drive screw 62 via a gear train 56. Threadably engaged with the drive screw 62 is a nonrotative nut 58 which has operatively associated therewith a piston 63 which is slidably mounted within a bore 64. The piston has a home position (not shown in FIG. 1) wherein extension of the piston 63 in the upward position causes pressurization of the wheel brake, and retraction of the piston 63 causes a reduction of pressure within the wheel brake 70.

Area A1 of the primary piston, the annular area of the primary piston between its first diameter 22 and its second diameter 24, is exposed to the pressure within the first pressure chamber 36. The pressure within the first pressure chamber 36 is equal to the actual brake line pressure and provides a pressure force feedback path from the wheel brake 70 to the brake pedal 3. In normal operation, the solenoid valve 60 is closed and the volume formed by the area which projects upon the head 46 of the secondary piston A3 and the angular surrounding area between the diameter of the head 46 encircled by the second diameter 24 of the first piston A2 is fixed. It can be shown that the pressure in the second pressure chamber 38 is proportional to the difference between the force exerted on the pedal 3 and the force generated by the pressure within the brake 70 which acts upon the area A1.

In one control scheme, the pressure in the second pressure chamber 38 is held at zero by increasing or decreasing the pressure generated by the actuator 50. As the pedal forces vary, the pressure generated by the actuator 50 will be equal to the pressure generated by an equivalent master cylinder of area A1. For example, if area A1 is equal to 0.1 inch square, then 50 pounds of force applied to the pedal will result in 500 pounds per square inch (psi) in the line 52 when the pressure in the second pressure chamber 38 is equal to zero. The above means that with appropriately sized areas, any pedal force to output relationship may be provided. The pedal displacement to pressure relationship is primarily a function of the ratios of the areas of A2 to A3 and the spring constant of the spring 74. With a proper selection of spring rates and areas, the present braking system design can be used to achieve any force/pressure/displacement characteristics required without regard to the volume of the wheel brake 70.

Caliper characteristics must only be considered with respect to a failed system performance (failure due to electric system failure). In a failed system, the sum of areas A1, A2 and A3 must allow required pressure to be generated by appropriate pedal force. A1 is sized for normal boost operation, and A2 and A3 will be sized in light of failed system operation. The only constraint on A2 and A3 is that their ratio be correct for the desired pedal compliance. Typical values for such a system would be for A1 to equal 0.1 inch squared, A2 to equal 0.25 inch squared, and A3 to equal 0.05 inch squared.

As mentioned previously, in failed system operation, because it is normally open, the solenoid will fail to the open position. Therefore, a force input onto the brake pedal 3 will cause movement not only of the second piston 40 but also of the outer first piston 20 with only a slight compliance caused by the spring 74.

It will also be apparent to those skilled in the art that the O-rings 23 and 34 may be permanently affixed within grooves (not shown) of the bore 11 of the master cylinder rather than being carried on the first piston 20 if so desired by design constraints.

Antilock braking operation is achieved by the controller ignoring the sensed values from the transducer 75 and signaling the actuator 50 directly to achieve the pressures desired to bring the wheel speed of the wheel as detected by a sensor (not shown) back within predetermined parameters. If traction control mode is desired, again the controller will signal the actuator 50 to pressurize the wheel brakes 70, and additionally the solenoid 60 will be signaled to the closed position.

In an alternative design configuration, the actuator 50 may be signaled to pressurize the wheel brake 70 as a function of the pressure experienced by the pressure transducer 75. If so desired by the designer, operator input by the vehicle operator may be utilized to set the gain or the proportional boost of the actuator 50 to give a pedal characteristic which is more pleasing to the vehicle operator.

When the braking system 7 is used in conjunction with an electric deceleration regenerative braking system (not shown), the controller will reset the "gain" of the system to make the pressure in chamber 38 the proper proportion of the pressure in line 52 so that the braking provided by the braking system 7 will appropriately change with demand (typically increasing as vehicle speed decelerates).

Figure 2:
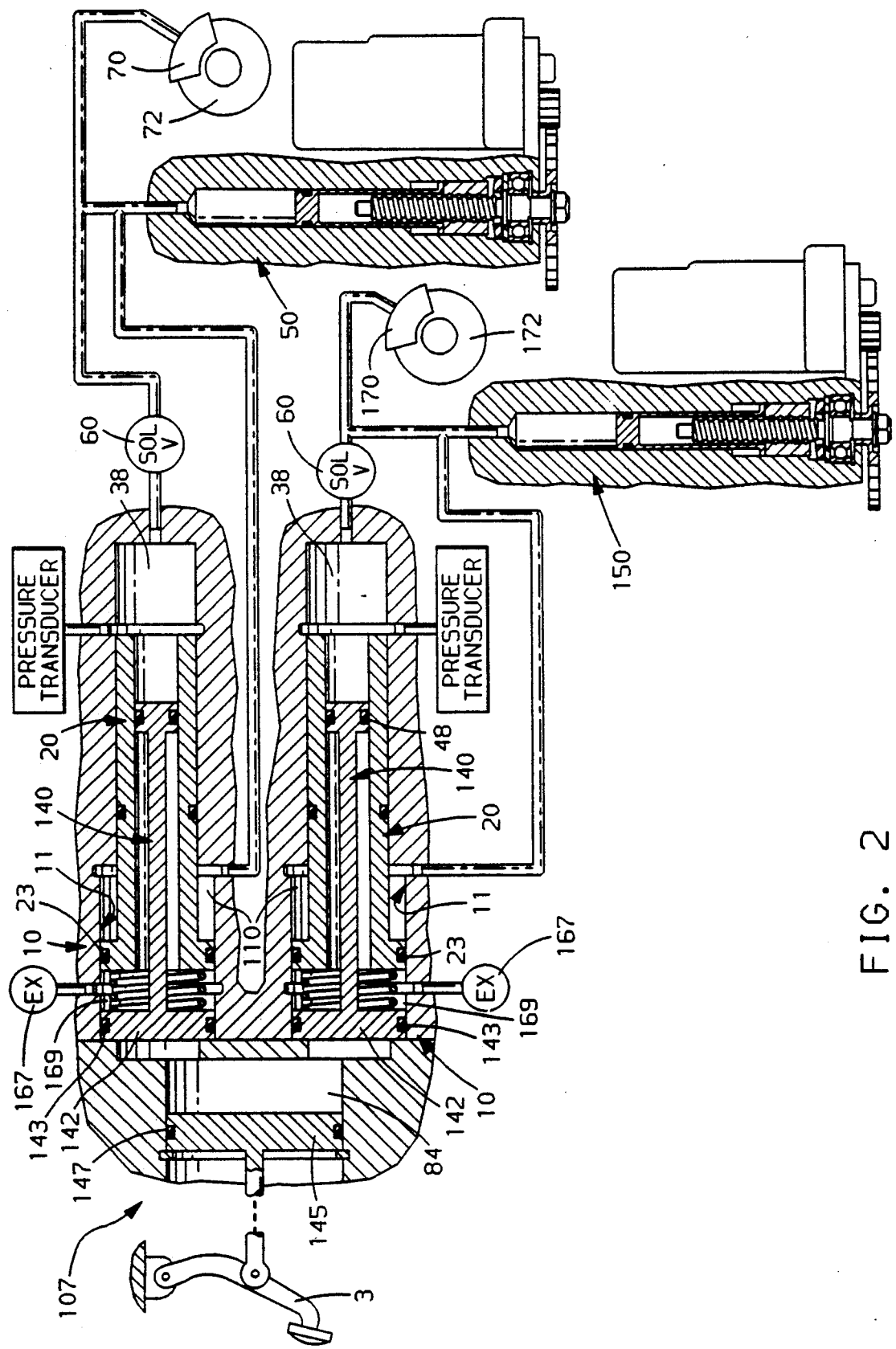
FIGS. 2 and 3 are schematic views of alternative preferred embodiments of the present invention from that shown in FIG. 1.

Referring to FIG. 2 wherein similar structure is given identical reference numerals, there is provided a braking system 107 which can be utilized for a plurality of vehicle wheel brakes 72 and 172. Braking system 107 has two master cylinders 10. Additionally, the secondary pistons 140 each have their flange members 142 sealably mounted within the bore 11 sealed by an O-ring 143. An auxiliary piston 145 sealed by an O-ring 147 provides a fluid input to actuate the respective master cylinders 10. The area 169 between the second piston flange 142 and the first piston 20 is sealed by seals 143, 23 and exposed to a vent 167. Operation of the braking system will be essentially the same as previously described wherein the actuators 50, 150 are programmed to pressurize the wheel brakes 70, 170 at a proportion of the pressure in the first pressure chamber 110 or to maintain the pressure in the second pressure chamber 38 at zero.

Figure 3:
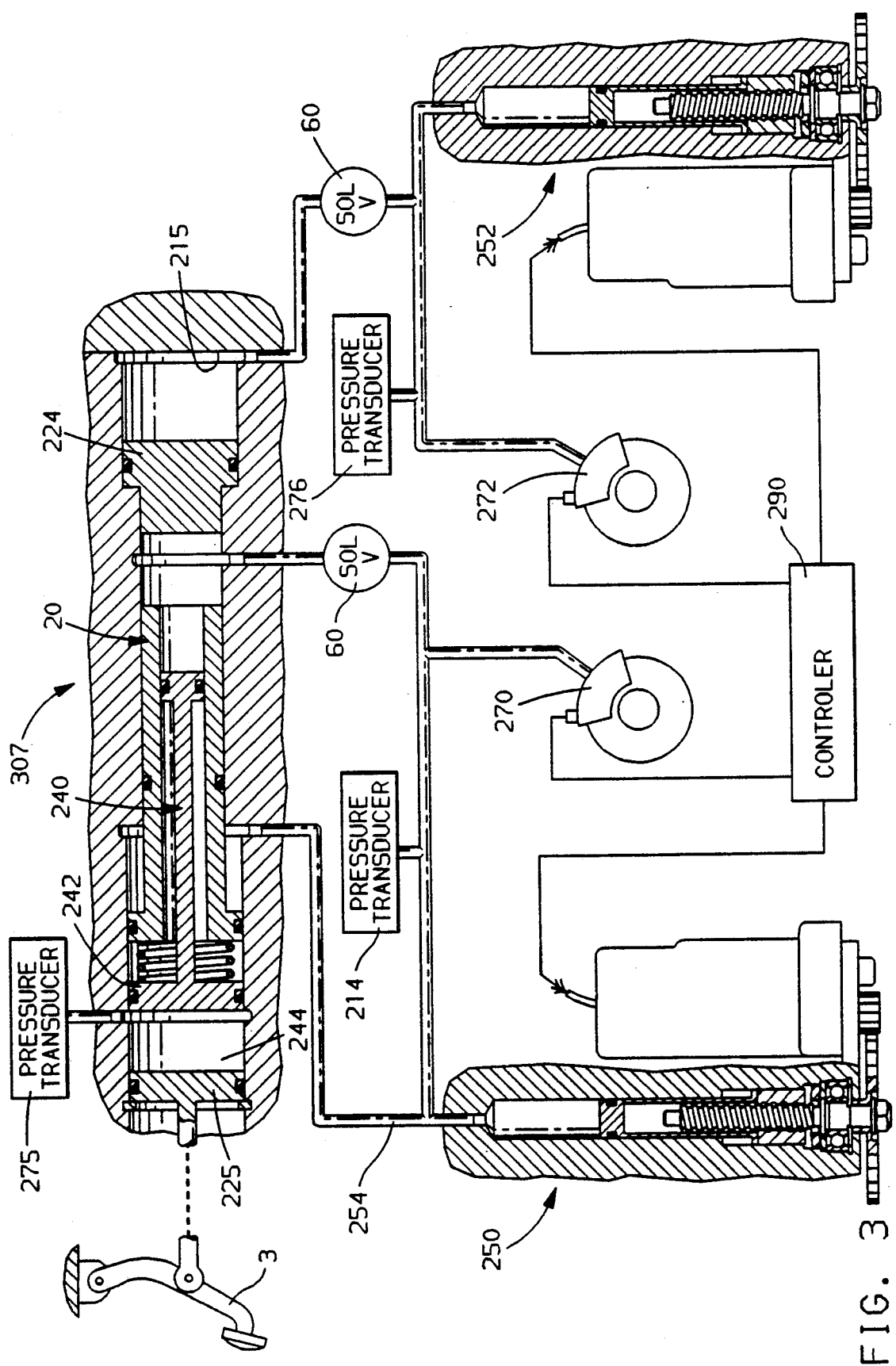

Referring to FIG. 3, a third embodiment 307 of the present invention is provided having additionally a third piston 224. The sensed pressure will be within a fourth pressure chamber 244 defined between a fourth piston 225 and the sealed flange 242 of the second piston 240. The pressure in the fourth pressure chamber 244 will be fed to a controller 290 from pressure transducer 275, which will then be utilized to signal for the appropriate boost pressure to the actuators 250 and 252. The third piston 224 provides isolation between the wheel brakes 270 and 272. Additionally, pressure transducers 214 and 276 are provided to allow control feedback to their respective actuators to ensure a pressure at a desired proportion of the pressure experience within the third pressure chamber 244.

Upon an electric failure of solenoid valves 60, movement of the first piston 20 toward a closed end 215 of the bore will cause the third piston 224 to pressurize the wheel brake 272. The wheel brake 270 will also be pressurized via its fluid line 254.

While embodiments of the present invention have been explained, it will be readily apparent to those skilled in the art of the various modifications which may be made to the present invention without departing from the spirit and scope of this application as it is encompassed by the following claims.

The embodiments of the invention in which an exclusive property or privilege is claimed are defined as follows:

1. A braking system for restraining rotation of an automotive vehicle wheel comprising:
   a fluid-actuated wheel brake for restraining rotation of the vehicle wheel;
   master cylinder means having a bore with a first diameter and a second smaller diameter, the master cylinder means bore having a closed end;
   first piston means slidably mounted within the master cylinder means having a first seal periphery sealed with the master cylinder bore first diameter and a second seal periphery sealed with the master cylinder bore second diameter, the first piston means establishing within the master cylinder bore a first pressure chamber between the first and second seal peripheries and a second pressure chamber between the first piston second sealed periphery and the closed end of the master cylinder bore, the first piston means also having a central bore exposed to the second pressure chamber;
   a first fluid line joining the first pressure chamber with the wheel brake;
   a second fluid line joining the second pressure chamber with the wheel brake;
   second piston means slidably sealably inserted within the first piston bore, the second piston means having a flange means;
   a stop means limiting displacement of the second piston means away from the master cylinder means closed end;
   compliance means captured between the first piston and the second piston flange means;
   pressure sensor means for determining the pressure within the second pressure chamber and delivering a signal representative thereof;
   solenoid valve means located in the second fluid line, the solenoid valve means closing upon a signal delivered by actuation of the second piston means; and
   electrically powered actuator means fluidly coupled to the first fluid line to modulate the pressure within the wheel brake in response to the signal given by the pressure sensor means.

2. A braking system as described in claim 1 further comprising angular sealing members connected with the first piston means to provide the first piston means with a sealed periphery with respect to the master cylinder bore.

3. A braking system as described in claim 1 wherein during actuation of the secondary piston means, the actuator means attempt to modulate a pressure within the first pressure chamber such that the pressure within the second pressure chamber remains at zero.

4. A braking system as described in claim 1 wherein the actuator means will modulate the fluid pressure within the first pressure chamber to be a proportion of the fluid pressure experienced within the second pressure chamber.

5. A braking system as described in claim 1 wherein the actuator means is a threaded actuator having a drive screw threadably engaged with a nonrotative nut which is in turn operatively associated with a piston slidably mounted within a bore of the actuator means.

6. A braking system as described in claim 1 further comprising the flange of the second piston means being sealed with a diameter of the master cylinder bore and wherein there is an auxiliary piston slidably sealably mounted within a bore fluidly operatively associated with the master cylinder bore forming an auxiliary pressure chamber between the auxiliary piston and the flange of the second piston means, the auxiliary piston means being operatively associated with a push rod provided for delivering a fluid signal to the flange of the second piston means.

7. A braking system as described in claim 6 further comprising a generally identical braking system for a second wheel brake wherein first and second braking systems share in common the auxiliary piston.

8. A braking system for first and second automotive vehicle wheels comprising:

first and second fluid-actuated wheel brakes associated with the first and second vehicle wheels, respectively;

a master cylinder having a bore with a first diameter and a second smaller diameter and a third diameter equal to the first diameter adjacent a closed end of the bore;

a first piston slidably sealably mounted within the master cylinder having a first sealed periphery with the master cylinder bore first diameter and a second sealed periphery with the master cylinder bore second diameter, the first piston establishing within the master cylinder bore a first pressure chamber between the first and second sealed peripheries of the primary piston and a second pressure chamber along an end of the first piston which is most adjacent the closed end of the master cylinder bore, the first piston having a central bore allowing communication therethrough;

a secondary piston slidably sealably mounted within the bore of the first piston having connected thereto a flange which is sealably slidably mounted within an area of the master cylinder bore exposed to the first diameter of the master cylinder bore;

a third piston sealably mounted within the third diameter of the master cylinder bore forming a third pressure chamber between itself and the closed end of the master cylinder bore;

a first fluid line connecting the first wheel brake with the first pressure chamber;

a second fluid line having inserted therein a normally open solenoid valve connecting the first wheel brake with the second pressure chamber;

a third fluid line connecting the second wheel brake with the third pressure chamber;

compliance means captured between the flange of the second piston and the first piston;

a fourth piston operatively associated with a push rod sealably mounted within the master cylinder bore opposed to the second piston flange forming a fourth pressure chamber therebetween;

pressure sensor means for determining the pressure within the second pressure chamber and delivering a signal representative thereof; and first and second fluid electrically-powered actuators fluidly connected with the first and second wheel brakes, respectively, for modulating the pressure within the respective wheel brakes as a function of the pressure within the fourth pressure chamber.

* * * * *